(12) United States Patent
Goker et al.

(10) Patent No.: US 11,664,052 B2
(45) Date of Patent: May 30, 2023

(54) SYSTEM AND METHOD FOR CLEANING ADVANCED LTO TAPE SYSTEMS

(71) Applicant: Quantum Corporation, San Jose, CA (US)

(72) Inventors: Turguy Goker, Oceanside, CA (US); James P. Peng, Santa Maria, CA (US)

(73) Assignee: QUANTUM CORPORATION, San Jose, CA (US)

( * ) Notice: Subject to any disclaimer, the term of this patent is extended or adjusted under 35 U.S.C. 154(b) by 28 days.

(21) Appl. No.: 17/351,483

(22) Filed: Jun. 18, 2021

(65) Prior Publication Data
US 2022/0406336 A1    Dec. 22, 2022

(51) Int. Cl.
*G11B 5/41*     (2006.01)
*G11B 23/50*   (2006.01)

(52) U.S. Cl.
CPC .............. *G11B 23/502* (2013.01); *G11B 5/41* (2013.01)

(58) Field of Classification Search
None
See application file for complete search history.

(56) References Cited

U.S. PATENT DOCUMENTS

| | | | | |
|---|---|---|---|---|
| 4,674,000 A * | 6/1987 | Lee | ........................... | G11B 5/41 |
| 4,761,700 A * | 8/1988 | Fritsch | ..................... | G11B 5/41 360/137 |
| 5,012,377 A * | 4/1991 | Siddio | ....................... | G11B 5/41 360/128 |
| 5,515,223 A * | 5/1996 | Grittmann | ............. | F16K 31/084 |
| 5,938,858 A * | 8/1999 | Yokoyama | ........... | C11D 7/5018 134/32 |
| 5,985,409 A * | 11/1999 | Miyazaki | ................. | G11B 5/41 |
| 6,028,751 A * | 2/2000 | Fritsch | ................. | G11B 23/049 360/134 |
| 6,798,617 B2 * | 9/2004 | Misawa | .................... | G11B 5/41 |
| 7,948,711 B2 * | 5/2011 | Biskeborn | ................ | G11B 5/41 360/134 |
| 11,037,588 B1 * | 6/2021 | Wiedemann | ........... | G11B 15/60 |
| 2002/0106497 A1 * | 8/2002 | Ishiguro | .................. | B32B 27/40 428/212 |
| 2005/0105202 A1 * | 5/2005 | Stewart | .................... | G11B 5/41 360/128 |
| 2006/0066998 A1 * | 3/2006 | Ishiguro | .................. | G11B 5/41 360/128 |
| 2006/0066999 A1 * | 3/2006 | Ejiri | ......................... | G11B 5/41 360/128 |
| 2006/0072234 A1 * | 4/2006 | Biskeborn | ................ | G11B 5/41 360/69 |
| 2006/0256474 A1 * | 11/2006 | Tanaka | ..................... | G11B 5/41 360/128 |
| 2007/0133127 A1 * | 6/2007 | Stamm | ................. | G11B 23/049 |
| 2007/0247754 A1 * | 10/2007 | Schuman | ................ | G11B 5/41 360/128 |

(Continued)

*Primary Examiner* — William J Klimowicz
(74) *Attorney, Agent, or Firm* — Roeder & Broder LLP; James P. Broder

(57) ABSTRACT

A tape cartridge for use in cleaning a head assembly of a tape drive includes a cartridge housing and a tape that is retained within the cartridge housing. The tape includes a cleaning section having a tape surface and an abrasive coating that is coupled to the tape surface. The tape has a tape thickness of between approximately three microns and seven microns. The abrasive coating has a surface roughness of at least approximately two nanometers.

20 Claims, 6 Drawing Sheets

(56) References Cited

U.S. PATENT DOCUMENTS

| | | | |
|---|---|---|---|
| 2009/0274836 A1* | 11/2009 | Bradshaw | G11B 5/00821 |
| | | | 427/127 |
| 2012/0320472 A1* | 12/2012 | Thompson | G11B 15/68 |
| 2015/0302879 A1* | 10/2015 | Holmberg | G11B 5/09 |
| | | | 360/76 |
| 2019/0221234 A1* | 7/2019 | Peng | G11B 5/41 |

* cited by examiner

SYSTEM AND METHOD FOR CLEANING ADVANCED LTO TAPE SYSTEMS

BACKGROUND

Automated tape library systems (also referred to herein simply as "tape libraries") continue to be a key storage tier in data storage infrastructure, especially for very large scale, data center type applications. Such tape libraries are commonly utilized for purposes of writing data to and reading data from tape cartridges, such as magnetic tape cartridges. Magnetic tape cartridges are configured to retain and/or store magnetic tape that can be used in a magnetic tape drive for purposes of reading data from and writing data to the magnetic tape. In a typical magnetic tape library, there can be hundreds to thousands of magnetic tape drives. In order to be able to use the magnetic tape library most efficiently and effectively, it is desired that each tape drive be maintained in peak performance to record and retrieve data for as long a period as possible. For purposes of maintaining the tape drive in such peak performance, it is recognized that the tape head in the tape drive is one of the most critical components that affects performance.

In various applications, the magnetic tape drive can operate in compliance with a Linear Tape Open (LTO) specification, such as LTO-8 or LTO-9, with the magnetic tape cartridges being LTO-compatible tape cartridges that retain LTO-compatible magnetic tape. The LTO format is an open format magnetic tape data storage technology that enables users to have access to multiple sources of storage media products that will be compatible with one another.

During use of the tape drive, the tape head of the tape drive is configured to be in direct contact with magnetic tape from a tape cartridge so that data can be written to and read from the tape as the tape moves across the tape head at varying speeds from low speed to high speed. This movement of the tape across the tape head creates friction, while also allowing dust and other particles from the surface of the tape to hone the tape head and collect and build a layer of contaminants, e.g., dust, debris, etc., on the surface of the tape head. Over time, this build-up of the layer of dust, debris, etc. on the surface of the tape head creates excessive separation (or "increased spacing") between the tape head and the tape. As a result of this excessive separation between the tape head and the tape, the transmission of data between the tape and the tape head begins to degrade until such point that the tape drive is eventually unusable due to an intolerable level of bit errors.

Signal-to-noise ratio (SNR) and bit error rate (BER) are important factors to evaluate and understand when contemplating the overall health of the tape head. The actual relationship between BER and SNR (or spacing loss) in an actual tape drive reaches a floor level for BER as the SNR increases or the spacing loss decreases to a certain point. Typically, SNR will get smaller (i.e. with more noise and/or less signal) as spacing increases between the magnetic tape and the tape head. Likewise, BER is generally expected to become smaller as SNR increases. However, due to media defects, there is typically a floor level the system will reach even when SNR increases. The floor level can vary greatly due to many factors that are seen within the environment in which the tape drive is operating as well as within the tape drive itself. Regardless, it is appreciated that tape drive and tape head performance essentially degrade together once the SNR gets sufficiently low, or the spacing loss and separation between the tape head and the tape gets sufficiently high.

To prevent those problems which may be caused by excessive separation between the tape head and the tape, a standard approach is to periodically clean the tape head with a cleaning cartridge. In various applications, the cleaning cartridge retains and uses a cleaning tape with sufficient surface roughness or abrasivity, i.e. an abrasive tape, to clean the tape head. In particular, once a cleaning cartridge is loaded into a tape drive, the more abrasive tape in the cleaning cartridge moves across the tape head and contacts the tape head. Consequently, the abrasive tape in the cleaning cartridge scrapes away the build-up of the layer of dust, debris, etc. that has been created on the tape head such that the excessive separation between the tape head and the tape is reduced. Unfortunately, excessive use of the cleaning cartridge can generate surface scratches and create pole tip recession, which is an unrecoverable permanent separation between the tape and the tape head (or sensor). In order to avoid excessive use of the cleaning cartridge, and maintain the longevity of the tape, it is desired to provide a means for determining and/or evaluating the health of the tape drive and the tape head so that the cleaning cartridge is only used when necessary. One such means for determining and/or evaluating the health of the tape drive and the tape head is described in detail in U.S. Pat. No. 10,559,322 (hereinafter the "'322 patent"), which, to the extent allowable, is incorporated in its entirety herein by reference. More specifically, the '322 patent teaches the use of the diagnostic tape that is selectively usable within the tape drive and that is configured to move across the tape head during use of the tape drive to determine the spacing between the tape and the tape head for different specially formatted sections of the diagnostic tape. Once the diagnostic tape spacing is determined to be too great, the operator understands that it is an appropriate time to clean the tape head of the tape drive.

While the '322 patent does provide a means for determining the optimal timing for using a standard head cleaning cartridge (sometimes referred to as "UCC", Universal (Head) Cleaning Cartridge) to minimize the abrasive effects of excessive use, the '322 patent does not address the changes that have occurred in the tape media itself in recent generations of tape drives to allow for higher densities and greater storage capacity, as well as the redesign of the head sensors and contours of tape heads themselves. The UCC was targeted to clean heads characteristically with near uniform contact pressure on the entire head surface. More particularly, when engaged with round contour read/write heads as used in the LTO-1 through LTO-6 designs, the UCC was able to use the higher contact pressure of the cleaning media against the read/write head to remove foreign matter from the head surface without significantly altering the round head contour. This "wear rate" equates to an efficiency of cleaning, and is proportional to the cleaning material contact pressure on the read/write head as follows:

$$\text{Abrasive "wear rate"} \approx \frac{PL}{H}$$

where H is the hardness,
P is the normal pressure, and
L is the sliding distance In such situations, the wear rate is more or less uniform across the entire tape head and is therefore acceptable because the distributive nature of the contact force is averaged over the entire surface.

However, in recent years the head sensor has changed from Anisotropic Magneto-Resistance (AMR), to Giant Magneto-Resistance (GMR), and most recently to Tunnel Magneto-Resistance (TMR), and the size has reduced from about 20 microns in early LTO-1 tape drives to 1 micron in the recent LTO-8 or LTO-9 tape drives. Additionally, for TMR head sensors the head contour has changed from the rounded, large wrap protruded dump design to a flat contour design with a smaller wrap angle.

When tape is in motion over a flat contour head, the first corner edge of the head that the tape encounters serves to skive air from the tape, therefore creating a sub-ambient air pressure, which bends the tape closer to the head surface. For a flat contour head, the contact pressure is generally concentrated on the two sharp end corner edges. In most applications, the flat contour tape head includes a tape head sensor that is positioned near a center of the tape head, i.e. approximately midway between the two corner edges.

The ability of the tape to take advantage of the sub-ambient air pressure and thus to be positioned closer and/or adjacent to the tape head sensor, so as to be better able to clean the tape head in and around the tape head sensor, is a factor of the thickness, and thus the stiffness, D, of the tape. In particular, the tape stiffness, D, can be calculated as:

$$D = \frac{E*c^3}{12(1-v^2)}, \text{ (tape stiffness)}$$

where,
E is tape elastic modulus
c is tape thickness
v is tape Poisson's ratio

The tape speed, V, tape density, $\rho$, and tape tension, $T_x$, also play a factor into displacement of the tape path, and thus the ability for the tape to be positioned closer and/or adjacent to the tape head sensor, as the tape moves across the flat contour tape head, as shown in the following displacement equation:

$$D\frac{d^4W}{dx^4} + (\rho V^2 - T_x)\frac{d^2W}{dx^2} = P_a - p + P_c \quad \text{Displacement Equation}$$

It is appreciated that the thickness of the LTO-compatible tapes has decreased over the years, with LTO-1 tapes having a thickness of approximately 8.9 microns±0.3 microns, LTO-8 tapes having a thickness of approximately 5.6 microns+0.2 microns or −0.3 microns, and current LTO-9 tapes having a thickness of approximately 5.2 microns±0.3 microns. Thus, with the differences in tape thickness, the original LTO-1 tapes have a stiffness that is approximately 5.6 times higher than the stiffness of the current LTO-9 tapes. Current LTO cleaning tape (UCC) specification requires the cleaning tape thickness to be approximately equal to that of the initial LTO-1 tapes, or approximately 8.9 microns±0.3 microns and for the current flat read/write heads being used in LTO drives. Due to the thickness, and corresponding stiffness, of the standard cleaning tape, the cleaning tape is generally not displaced sufficiently to be in proper and robust contact on the sensor location at the flat head contour of TMR head sensors. Thus, cleaning of the flat head contour tape head sensors of the LTO-8 and LTO-9 tape drives is too often ineffective.

Moreover, when a current cleaning cartridge is used on a flat contour tape head, it is not only generally ineffectual in removing stains in the low pressure region near the tape head sensor, but the abrasivity can also cause excessive rounding of the tape head due to a high contact-pressure region at the sharp edges of the head contour. Unfortunately, excessive abrasive wear will round the corner and weaken its air-skiving ability, a critical requirement for the flat contour to function. Stated in another manner, with excessive rounding of the tape head, the tape head cannot effectively maintain the flat contour and the resulting close spacing and low pressure. Thus, the flat contour design of the tape head can be destroyed, and the tape head may need be replaced. Due to the abrasive nature of the cleaning surface, the life of the tape head can be shortened, or the tape media conductive material smeared thereby causing head short damage.

In summary, for the flat read/write head used in LTO-8 and LTO-9 designs, with the UCC there is a very low contact pressure on the tape head near the tape head sensor. As a result, the use of the UCC due to the thicker media used and the head design, does not allow for the cleaning media used in the UCC to have appropriate contact with the head surface. Thus, the efficiency of cleaning is not acceptable for cleaning the head designs used in LTO-8 and LTO-9 tape drives. Due to the higher contact force at the edges of the flat head design, as previously discussed, an attempt to merely increase the overall contact pressure between the cleaning media and the heads would not be an option due to excessive wear forces applied by the edges. Another factor is that the flat head design of LTO-8 and LTO-9 uses TMR sensors which are more susceptible to scratching damage from asperities from the tape media, making the need for an effective cleaning process critical.

Furthermore, the use of cleaning solvents for cleaning tape heads is well known. In testing the use of cleaning solvents on sensor heads in a tape drive, it has been found that a single gentle wipe over the sensor head with a cotton swab with a dab of solvent can effectively clean tough stains that could not be removed after several UCC cleaning cycles. However, their use in a tape drive system has required that the tape drive system be in a power off configuration, otherwise the head sensor will be electrically shocked by an electro-static discharge (ESD) if it is in a powered state due to condensation buildup on the head surface. Thus, such cleaning procedures with cleaning solvents must be done as part of a manual cleaning procedure. Therefore, it is desired to provide an automated means for cleaning the tape head that will allow the tape drive system to turn off power to the head connectors before the cleaning process starts to allow for the application of a cleaning solvent as part of the cleaning cartridge system.

SUMMARY

The present invention is directed toward a tape cartridge for use in cleaning a head assembly of a tape drive, the tape cartridge including a cartridge housing and a tape that is retained within the cartridge housing. The tape includes a cleaning section having a tape surface and an abrasive coating that is coupled to the tape surface. The tape has a tape thickness of between approximately three microns and seven microns. The abrasive coating has a surface roughness of at least approximately two nanometers.

In some embodiments, the tape thickness is between approximately four microns and six microns. In other embodiments, the tape thickness is between approximately three microns and five-and-a-half microns. In still other embodiments, the tape thickness is approximately five microns.

In certain embodiments, the surface roughness of the abrasive coating is between approximately two nanometers and nine nanometers. In other embodiments, the surface roughness of the abrasive coating is between approximately two nanometers and six nanometers.

In some embodiments, the tape can further include a data section including one or more data tracks so that data can be written to and read from the data tracks within the data section of the tape. Additionally, in certain such embodiments, the data section can further include one or more servo tracks to ensure proper alignment of the tape.

The present invention is also directed toward a combination including a tape drive including a head assembly; and the tape cartridge as described above that is usable in the tape drive for cleaning the head assembly of the tape drive.

In some embodiments, the tape drive includes a drive controller that is configured to control movement of the tape from the tape cartridge across a head surface of the head assembly to clean the head assembly of the tape drive. In certain such embodiments, the drive controller is further configured to control power from a power supply such that power can be selectively turned off to the head assembly while power is otherwise being supplied to operate the tape drive.

The present invention is also directed toward a combination including a tape drive including (i) a drive housing that is configured to selectively receive a tape cartridge; (ii) a head assembly positioned within the drive housing that is configured for writing data to and reading data from a tape that is retained within a cartridge housing of the tape cartridge; and (ii) a drive controller positioned within the drive housing that is configured to control operation of the tape drive; a cleaning mechanism that is configured to clean the head assembly of the tape drive under control of the drive controller; and a power supply that is configured to supply power to the tape drive, the drive controller being electrically coupled to the power supply, the drive controller being configured to selectively turn off power to the head assembly of the tape drive while power is otherwise being supplied to operate the tape drive.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
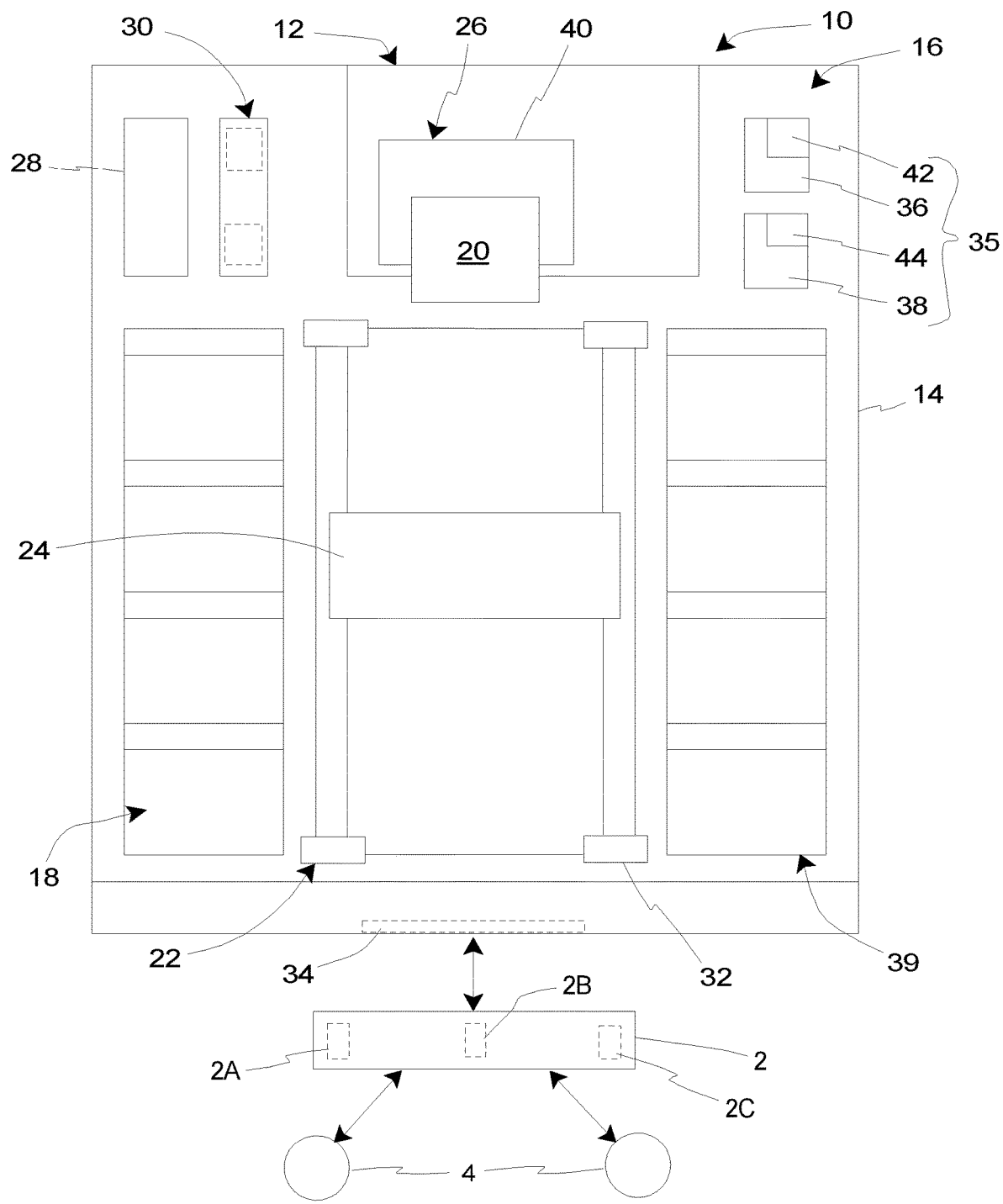
FIG. 1 is a simplified schematic top view illustration of one or more hosts, one or more users, and an embodiment of an automated media library system having features of the present invention.

Embodiments of the present invention are described herein in the context of systems and methods for cleaning advanced LTO tape systems, such as systems that operate in compliance with an LTO specification such as LTO-8 or LTO-9, which have tape drives having a flat contour tape head design and that utilize TMR sensors. It is appreciated that in various implementations, the systems and methods for cleaning the advanced LTO tape systems will only be employed after separate procedures are engaged in to determine if and when an appropriate cleaning procedure should be pursued, such as described, for example, in the '322 patent.

In certain embodiments, the present invention includes a cleaning cartridge that retains a cleaning tape that is thinner than what is required pursuant to current UCC specifications, but which also has sufficient surface roughness, or abrasivity, to enable effective cleaning of the tape head assembly (or "tape heads") of the tape drives of such advanced LTO tape systems. Stated in another manner, in such embodiments, the present invention discloses a cleaning tape having a thinner base-film and abrasive coating which is proposed to provide a better surface polish of the current flat read/write tape head than is otherwise provided by the current UCC design. As such, the present invention provides a new cleaning tape concept, wherein the tape thickness compliments the read/write media thickness, such as for LTO-8 and LTO-9 compatible tape cartridges, including backward compatibility where writes are allowed, meaning the thickness of the cleaning tape is to be thinner than previous generations where backward compatibility is not maintained.

In other embodiments, the present invention describes an automated tape head cleaning system and method that utilizes cleaning solvents to clean the tape heads of the tape drives while power is being provided to the tape drive, but while power is not being provided to the tape heads. In such embodiments, the automated cleaning procedures can be performed through modifications made to the cleaning cartridge and/or to the tape drive itself, with cleaning solvents being controllably injected onto the cleaning tape and/or onto a cleaning brush of the tape drive for purposes of cleaning the tape head, and with the tape head subsequently being dried prior to full power again being provided to the tape head.

Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same or similar reference indicators will be used throughout the drawings and the following detailed description to refer to the same or like parts.

In the interest of clarity, not all of the routine features of the implementations described herein are shown and described. It will, of course, be appreciated that in the development of any such actual implementations, numerous implementation-specific decisions must be made in order to achieve the developer's specific goals, such as compliance with application-related and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

FIG. 1 is a simplified schematic top view illustration of one or more hosts 2 (only one is illustrated in FIG. 1), one or more users 4 (two are illustrated in FIG. 1), and an automated tape library system 10 (also referred to herein simply as a "tape library") having features of the present invention, including a tape drive system 12 that includes one or more tape drives 26. In FIG. 1, a top cover (not shown) has been omitted for clarity so that the interior of the tape library 10 is visible.

In certain applications, the one or more tape drives 26 are configured to receive a tape cartridge 20 therein and to perform desired operations utilizing a tape 250 (illustrated in FIG. 2) that is retained within the tape cartridge 20. In one such application, the tape 250 is a magnetic tape, and the one or more tape drives 26 are configured for writing data to and/or reading data from the magnetic tape 250 that is retained within the tape cartridge 20. In another such application, the tape 250 is a cleaning tape that is configured to provide cleaning operations on a tape head assembly 256 (or "tape heads", illustrated in FIG. 2) of the one or more tape drives 26.

As illustrated, the one or more hosts 2 provide a means of access to the tape library 10 for the one or more users 4. Moreover, during operation, the one or more users 4 can issue requests or instructions to the tape library 10 that are forwarded via the one or more hosts 2. The one or more hosts 2 can include host firmware 2A (illustrated as a box in phantom), host hardware 2B (illustrated as a box in phantom) and host software 2C (illustrated as a box in phantom) for purposes of forwarding user requests to the tape library 10 and/or for performing any other functions of the one or more hosts 2. Although only one host 2 is illustrated in FIG. 1, it is recognized that any number of hosts can be wired and/or wirelessly connected for use with the tape library 10 to provide a means of access to the tape library 10 for the one or more users 4. Additionally, as shown in the embodiment illustrated in FIG. 1, the tape library 10 can be accessible to two users 4. Alternatively, access to the tape library 10 can be limited to only one user 4 or access to the tape library 10 can be provided to more than two users 4.

The tape library 10 can have any suitable design that is capable of storing a plurality of tape cartridges 20 and using one or more tape drives 26 to write data to and read data from the plurality of tape cartridges 20, and/or to clean the tape heads 256 of the tape drives 26. More specifically, it is noted that the tape library 10 illustrated in FIG. 1 is just one non-exclusive example of a tape library 10 usable with the present invention, and no limitations are intended based on the specific type and/or size of the tape library 10 shown in FIG. 1.

In various embodiments, as illustrated, the tape library 10 can include one or more of: (i) a library housing 14 that defines an library interior 16, (ii) a plurality of storage slots 18 that are each configured to receive and selectively retain (and store) a tape cartridge 20, (iii) a rack assembly 22, (iv) a tape cartridge retrieval assembly 24 (also sometimes referred to herein as a "retrieval assembly"), (v) the tape drive system 12 including the one or more tape drives 26, (vi) a power supply 28, (vii) a library control system 30, (viii) one or more racks 32, (ix) a graphical user interface 34 (illustrated in phantom, and also sometimes referred to herein as a "GUI"), and (x) a climate controller 35. In some embodiments, the climate controller 35 can include one or more temperature controllers 36 (only one temperature controller 36 is illustrated in FIG. 1), and/or one or more humidity controllers 38 (only one humidity controller 38 is illustrated in FIG. 1).

As an overview, the tape library 10 is uniquely configured to implement desired cleaning procedures for the tape heads 256 of the tape drives 26 when such cleaning procedures are deemed to be appropriate and timely. More specifically, in some embodiments, the tape cartridge 20 is a cleaning cartridge that retains a cleaning tape 250 that is thinner than what is required pursuant to current UCC specifications, but which also has sufficient surface roughness, or abrasivity, to enable effective cleaning of the tape heads 256 of the tape drives 26. In such embodiments, the cleaning tape 250 is uniquely configured to have a tape thickness 350T (illustrated in FIG. 3) that is less than or thinner than that of current UCC design, but with sufficient abrasivity to provide a better surface polish of the tape heads 256 than is otherwise provided by the current UCC design. In other embodiments, the tape library 10 can implement and/or include an automated tape head cleaning system and method that utilizes cleaning solvents to clean the tape heads 256 of the tape drives 26 while power is being provided to the tape drive 26, but while power is not being provided to the tape heads 256. In such embodiments, the automated cleaning procedures can be implemented via modifications made to the tape cartridge 20 (i.e. the cleaning cartridge) and/or to the tape drive 26 itself.

The library housing 14 is configured to retain various components of the tape library 10. For example, in the embodiment illustrated in FIG. 1, the plurality of storage slots 18, the rack assembly 22, the retrieval assembly 24, the one or more tape drives 26 of the tape drive system 12, the power supply 28, the library control system 30, the rack(s) 32, and the climate controller 35 can all be received and retained at least substantially, if not entirely, within the library interior 16. As illustrated in FIG. 1, the library housing 14 can be rigid and can have a substantially rectangular-shaped cross-section. Alternatively, the library housing 14 can have another suitable shape or configuration. For example, the library housing 14 can have a substantially square-shaped or any other suitable shaped cross-section. Further, the library housing 14 may be constructed of any number of conventional materials such as, for example, those utilized in industry standard rack mount cabinets.

In the embodiment shown in FIG. 1, the plurality of storage slots 18 can be positioned within the library housing 14, with the storage slots 18 being configured to receive and retain (and store) the tape cartridge(s) 20. More particularly, in various embodiments, each of the storage slots 18 is configured to receive and retain a single tape cartridge 20. It is noted that no tape cartridges 20 are shown as being retained within the storage slots 18 in FIG. 1 for clarity.

The tape library 10 can include any suitable number of storage slots 18, and/or the tape library 10 can be designed to retain any suitable number of tape cartridges 20. Moreover, the storage slots 18 can be arranged within the tape library 10 in any suitable manner. For example, in certain embodiments, the tape library 10 can include forty storage slots 18 arranged in two four-by-five storage areas. More particularly, in this embodiment, the tape library 10 includes two magazines 39, one on each side of the retrieval assembly 24, with each magazine 39 including four columns of storage slots 18, and with each column having five storage slots 18 oriented substantially horizontally one on top of another (with limited spacing therebetween). It is understood that from the simplified top view shown in FIG. 1, the number of storage slots 18 in each column is not readily apparent. Alternatively, the tape library 10 can include greater than forty or fewer than forty storage slots 18 and/or the storage slots 18 can be arranged in a different manner than is illustrated and described in relation to FIG. 1. For example, in certain non-exclusive alternative embodiments, the tape library 10 can be configured to include hundreds or even thousands of storage slots 18, each being configured to receive and retain a separate tape cartridge 20.

The tape cartridges 20 can have any suitable design for use within the tape library 10 and/or within any of the tape drives 26. For example, in one embodiment, the tape cartridge 20 can include a tape 250 having at least one servo track (not shown) and a plurality of data tracks (not shown) that run along a longitudinal length of the tape 250. With such design, the servo track(s) can be utilized to ensure the proper alignment between the tape heads 256 and the tape 250; and the data tracks can be utilized for purposes of writing data to and reading data from the tape 250. In another embodiment, the tape cartridge 20 can include a tape 250 in the form of a cleaning tape that is used exclusively for purposes of cleaning the tape heads 256 of the tape drive 26 in accordance with certain aspects of the present invention. In still another embodiment, the tape cartridge 20 can include a tape that includes at least one servo track and a plurality of data tracks, such as noted above, in one or more sections of the tape 250; and the tape 250 can further include a cleaning section that is used for purposes of cleaning the tape heads 256 of the tape drive 26 in accordance with certain aspects of the present invention. As such, this embodiment of the tape cartridge 20 includes a hybrid tape 250 that is usable for both writing data to and reading data from the tape 250, as well as providing desired cleaning of the tape heads 256 of the tape drive 26. Moreover, with such embodiment, the tape cartridge 20 and/or the tape 250 can be used initially for purposes of cleaning the tape heads 256 of the tape drive 26 and then subsequently for purposes of writing data to and/or reading data from the tape 250 as a means to test the efficacy of the tape head cleaning procedure.

The design and configuration of the rack assembly 22 can be varied to suit the specific requirements of the tape library 10. For example, in one non-exclusive embodiment, the rack assembly 22 can include four individual racks 32 that are spaced apart from one another. In some embodiments, each rack 32 can be oriented in a generally vertical direction and can extend a height that is sufficient to enable the retrieval assembly 24 to effectively retrieve a tape cartridge 20 from any of the plurality of storage slots 18. Alternatively, the rack assembly 22 can include a different number of racks 32. For example, in some non-exclusive alternative embodiments, the rack assembly 22 can include two racks 32, three racks 32 or more than four racks 32 that can be spaced apart from one another.

The retrieval assembly 24 selectively, e.g., upon request of a user 4 or host application 2, retrieves and moves the tape cartridges 20 as desired between the storage slots 18 and the tape drives 26. In particular, during use, upon receiving a signal from the library control system 30 to access a certain tape cartridge 20, the retrieval assembly 24 can be manipulated to physically retrieve the requested tape cartridge 20 from its associated storage slot 18 in the tape library 10. Subsequently, the retrieval assembly 24 moves the tape cartridge 20 to an appropriate tape drive 26, and inserts the tape cartridge 20 into a drive housing 40 of the tape drive 26 so that the requested operations, such as any suitable read/write operations and/or a cleaning operation, can be performed. Upon completion of the requested read/write operations and/or cleaning operations, the retrieval assembly 24 can then return the tape cartridge 20 to an appropriate storage slot 18.

It is appreciated that although a single retrieval assembly 24 is illustrated in FIG. 1, the tape library 10 can be designed to include more than one retrieval assembly 24. For example, in one non-exclusive alternative embodiment, the tape library 10 can include two retrieval assemblies 24 that function in different portions of the tape library 10 and/or that provide redundancy in the event that one of the retrieval assemblies 24 fails.

The one or more tape drives 26 are configured for reading and/or writing data with respect to the tape cartridge 20. Further, as noted, the one or more tape drives 26 can be configured to utilize a tape cartridge 20 that is provided, at least in part, in the form of a cleaning cartridge to perform desired cleaning operations on the tape heads 256 of the tape drive 26.

The number of tape drives 26 provided within the tape library 10 can be varied to suit the specific requirements of the tape library 10. For example, in certain embodiments, the tape library 10 can include three tape drives 26 that are stacked substantially one on top of another (with limited spacing therebetween). Alternatively, the tape library 10 can include greater than three or fewer than three tape drives 26 and/or the tape drives 26 can be positioned in a different manner relative to one another. For example, in certain non-exclusive alternative embodiments, the tape library 10 can be configured to include one hundred or more tape drives 26.

In certain embodiments, the tape library 10 can include more than a single tape drive system 12 for purposes of providing the one or more tape drives 26. For example, in some embodiments, the tape library 10 can include a plurality of tape drive systems 12, with each tape drive system 12 including one or more individual tape drives 26. In one such embodiment, the tape library 10 can include three individual tape drive systems 12, with each tape drive system 12 including a single tape drive 26, to provide a total of three tape drives 26 for the tape library 10. Alternatively, the tape library 10 can include any desired number of tape drive systems 12 and/or tape drives 26.

The power supply 28 provides electrical power in a well-known manner to the one or more tape drives 26, the retrieval assembly 24, the library control system 30 and/or additional tape libraries 10. The power supply 28 can be interfaced with these components as well as with an external power source in a well-known manner using industry standard cabling and connections. Alternatively, the power supply 28 can be interfaced with these components in another manner.

The library control system 30 provides the desired and necessary control for oversight functionality of the tape library 10, including at least operation of the retrieval assembly 24 and the climate controller 35. Additionally, in some implementations, the library control system 30 can provide at least partial control of the operation of the tape drives 26. The library control system 30 can have any suitable design, many of which are well-known in the industry. For example, in one embodiment, the library control system 30 can include a standard driver interface unit for receiving digital commands and translating the commands into driving currents, such as step pulses for controlling stepper motors, and/or for controlling the climate controller 35. Further, the library control system 30 can include a standard programmable general-purpose computer formed on a single plug-in card unit and can include a programmed microprocessor or microcontroller, memory, communication interface, control interface, connectors, etc. Alternatively, the library control system 30 can have a different design and/or the library control system 30 can be positioned within the tape library 10 in a different position or manner than that illustrated in FIG. 1.

The tape library 10 can use well-known industry standard cabling and communication protocols between the library control system 30 and other structures of the tape library 10. Cabling and electrical characteristics including signaling protocols can be generally standardized, and the logical message protocols can be either proprietary or standardized as known to those skilled in the art.

As shown, the tape library 10 can also include the GUI 34, such as an interactive touchscreen graphical user interface or another suitable graphical user interface, which allows the user 4 or host 2 to interact with and/or transmit requests or commands to and/or from the tape library 10.

The climate controller 35 controls the climate within the library interior 16. In various embodiments, the climate controller 35 can regulate, adjust, control and/or maintain a specific climate within the library interior 16. In certain embodiments, at various times, the specific climate that is regulated, adjusted, controlled and/or maintained by the climate controller 35 within the library interior 16 can be based on a climate outside of the library interior 16. As noted, in certain embodiments, the climate controller 35 includes the temperature controller 36 and the humidity controller 38.

The temperature controller 36 regulates and/or adjusts the temperature within the library interior 16 of the tape library 10. The design and/or particular type of temperature controller 36 included in the tape library 10 can vary. For example, the temperature controller 36 can include any suitable type of cooling unit that can selectively lower the temperature within the library interior 16; and/or the temperature controller 36 can include any suitable type of heating unit that can selectively increase the temperature within the library interior 16. In various embodiments, the temperature controller 36 can include one or more temperature sensors 42 (only one temperature sensor 42 is illustrated in FIG. 1) that can sense an ambient temperature within or outside of the library interior 16. The temperature sensor(s) 42 can have any suitable design and/or can be positioned in any suitable location(s), such as within and outside of the library interior 16 of the tape library 10. In certain embodiments, the temperature controller 36 can receive data from the temperature sensor 42, and automatically adjust and/or control the temperature within the library interior 16 in accordance with predetermined temperature standards based on such data.

The humidity controller 38 regulates and/or adjusts the humidity within the library interior 16 of the tape library 10. The design and/or particular type of humidity controller 38 included in the tape library 10 can vary. For example, the humidity controller 38 can include any type of humidifier or dehumidifier, or any other suitable type of humidity controller 38 that can selectively change and/or control the humidity within the library interior 16. In various embodiments, the humidity controller 38 can include one or more humidity sensors 44 (only one humidity sensor 44 is illustrated in FIG. 1) that can sense the humidity within or outside of the library interior 16. The humidity sensor(s) 44 can have any suitable design and/or can be positioned in any suitable location(s), such as within and outside of the library interior 16 of the tape library 10. In certain embodiments, the humidity controller 38 can receive data from the humidity sensor 44, and automatically adjust and/or control the humidity within the library interior 16 in accordance with predetermined humidity standards based on such data.

Figure 2:
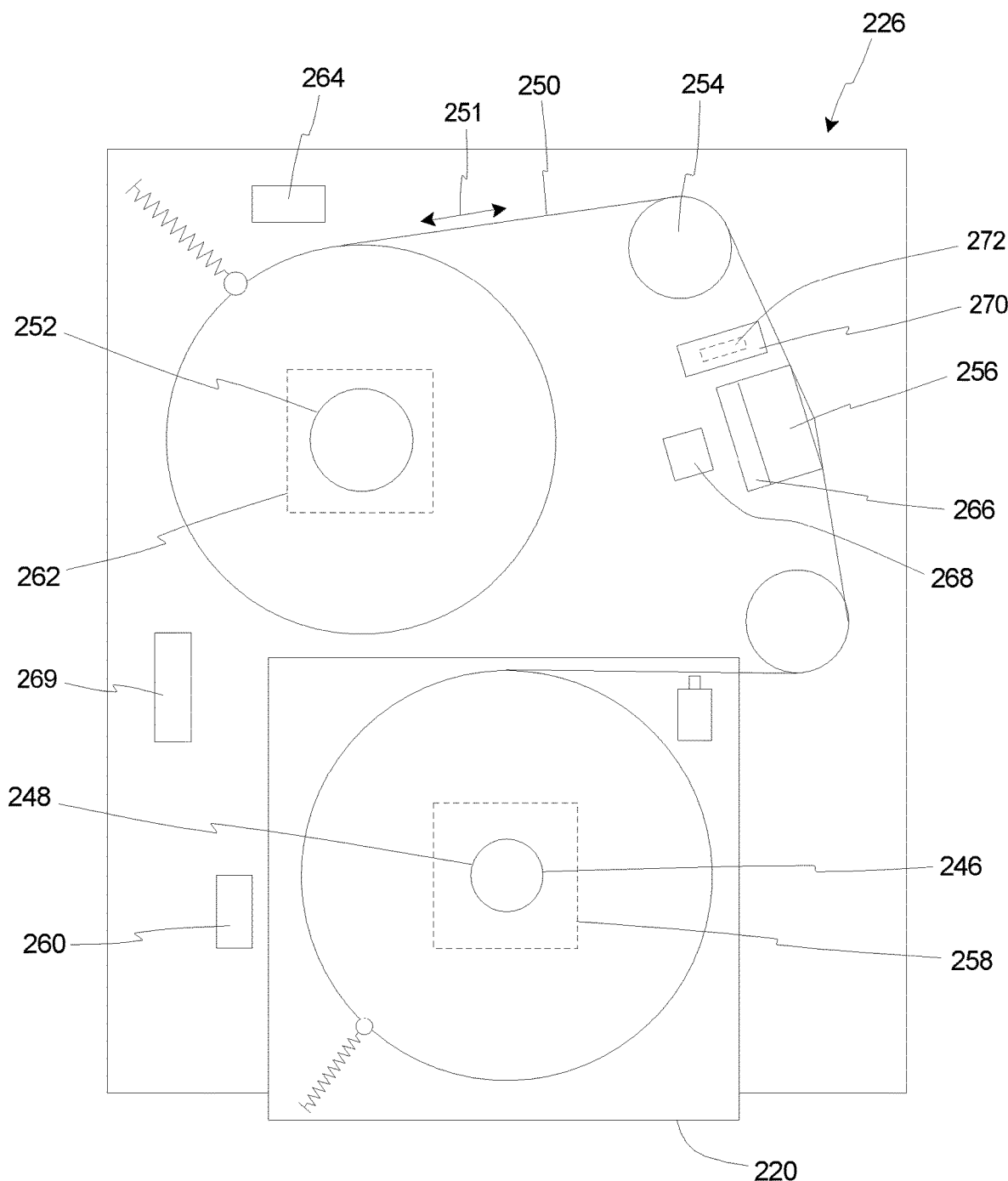
FIG. 2 is a simplified schematic top view illustration of an embodiment of a tape drive and a tape cartridge having features of the present invention that has been inserted into the tape drive.

FIG. 2 is a simplified schematic top view illustration of a tape drive 226, and a tape cartridge 220 that has been inserted into the tape drive 226, which can be included as part of the tape library system 10 illustrated in FIG. 1. In FIG. 2, covers for the tape drive 226 and the tape cartridge 220 have been omitted for clarity so that the interior of such components is visible. It is appreciated that the tape drive 226 as shown in FIG. 2 represents a generic tape drive that can be formatted to include features of the present invention, and is shown by way of example and not by way of limitation. In some embodiments, the tape drive 226 operates in compliance with an LTO specification, such as LTO-8 or LTO-9. Stated in another manner, in such embodiments, the tape cartridge 220 is an LTO-compatible tape cartridge.

During use of the tape drive 226, in one implementation, the tape cartridge 220 is inserted into the tape drive 226 to read data from and/or write data to a tape 250, such as a magnetic tape, that is retained within the tape cartridge 220. Additionally, or in the alternative, in another implementation, the tape cartridge 220 is inserted into the tape drive 226 to perform desired cleaning operations on the tape heads 256 of the tape drive 226 with the tape 250 being provided, at least in part, in the form of a cleaning tape.

As shown, the tape cartridge 220 includes a cartridge reel 246 that includes and/or defines a cartridge hub 248. The tape 250 is spooled about the cartridge hub 248 of the cartridge reel 246. In certain embodiments, the tape 250 can include at least one servo track (not shown in FIG. 2) and a plurality of data tracks (not shown in FIG. 2) that run along a longitudinal length of the tape 250. Each of these tracks can be positioned substantially parallel to each other. In such embodiments, the servo track(s) can be utilized to ensure the proper alignment between the tape heads 256 and the tape 250, and the data tracks can be utilized for purposes of writing data to and reading data from the tape 250. In other embodiments, the tape 250 can be a cleaning tape that is usable within the tape drive 226 for purposes of performing a cleaning procedure on the tape heads 256 of the tape drive 226. In still other embodiments, the tape 250 can be provided in the form of a hybrid tape, which includes one section of the tape 250 that is configured to provide desired cleaning of the tape heads 256 of the tape drive 226, and another section of the tape 250 that includes at least one servo track and a plurality of data tracks for purposes of accurately (e.g., with proper alignment) writing data to and reading data from such section of the tape 250.

The tape cartridge 220 supplies the tape 250 to the tape drive 226. More particularly, when the tape cartridge 220 is inserted into the tape drive 226, one end of the tape 250 is taken up within the tape drive 226 to be wrapped around a drive reel 252 included in the tape drive 226. The tape 250 traverses a predefined path 251 between the cartridge reel 246 and the drive reel 252, which is defined, a least in part, by one or more rollers 254 (two are shown in FIG. 2) positioned at strategic positions along the predefined path 251. The rollers 254 may also aid in limiting gross lateral movement (i.e. in and out of the page as shown in FIG. 2) of the tape 250, i.e. lateral tape motion or "LTM".

Along the predefined path 251, the drive reel 252 moves the tape 250 across the tape head assembly 256 (also sometimes referred to herein as "tape heads") that is configured to read data from and/or write data to the tape 250. In alternative embodiments, the tape heads 256 can include at least one read head, at least one write head, and/or at least one read/write head. In particular, the tape heads 256 is positioned in close proximity to the predefined path 251 of the tape 250 such that as the tape 250 travels in the longitudinal direction in a series of wraps (i.e. by being wound in a forward longitudinal direction from the cartridge reel 246 to the drive reel 252 or in a backward longitudinal direction from the drive reel 252 to the cartridge reel 246), the tape heads 256 can read/write data to particular tracks and longitudinal positions of the tape 250. Additionally, the tape heads 256 and/or a separate head assembly can include at least one servo element configured to read the servo track(s) of the tape 250 in order to effectively maintain proper alignment between the tape heads 256 and the tape 250. It is appreciated that the tape drive 226 can include any suitable number of tape heads within the tape heads 256 for purposes of reading data from and/or writing data to the tape 250. For example, in one non-exclusive embodiment, the head assembly 256 can include 32 heads for purposes of reading data from and/or writing data to the tape 250.

In some embodiments, as shown, the tape drive 226 can also include a cartridge reel motor 258 (illustrated as a box in phantom) that generates the necessary force to rotate the cartridge reel 246 at will, and a cartridge reel encoder 260, e.g., a sensor or detector, that is configured to output signals representing the pulse rate (or rotation rate) of the cartridge reel motor 258. The tape drive 226 can further include a drive reel motor 262 (illustrated as a box in phantom) that generates the necessary force to rotate the drive reel 252 at will, and a drive reel encoder 264, e.g., a sensor or detector, that is configured to output signals representing the pulse rate (or rotation rate) of the drive reel motor 262.

As illustrated in this embodiment, the tape drive 226 also includes an actuator 266 and a drive controller 268 that can be communicatively coupled to the tape heads 256. The actuator 266 is configured to control the lateral position of the tape heads 256 and/or the individual heads of the head assembly 256 relative to the tape 250 based on a signal provided by the drive controller 268. As such, the actuator 266 comprises a mechanical positioner to move the tape heads 256 up or down laterally. By controlling the lateral position of the tape heads 256 relative to the tape 250, particular tracks of the tape 250 can be accessed as desired. Alternatively, the tape drive 226 can include more than one actuator 266. For example, the tape drive 226 can include a separate actuator 266 for each tape head.

The drive controller 268 is in communication with the actuator 266 and a number of other components within the tape drive 226. For example, although not specifically shown in FIG. 2, each of the cartridge reel motor 258, the cartridge reel encoder 260, the drive reel motor 262, and the drive reel encoder 264 can be in communication with the drive controller 268. As such, the drive controller 268 can be configured to perform various specified operations, such as controlling speed of the movement of the tape 250 along the predefined path 251, either individually, or in combination with other software, hardware and/or firmware elements.

In certain embodiments, the drive controller 268 can be further configured such that power from the power supply 28 (illustrated in FIG. 1) is independently controlled to (i) move the tape 250 across the tape heads 256, such as by providing necessary power from the power supply 28 to one or more of the cartridge reel motor 258, the cartridge reel encoder 260, the drive reel motor 262, and the drive reel encoder 264, and (ii) operate the tape heads 256 for purposes of writing data to and reading data from the tape 250 as the tape 250 is moved across the tape heads 256. Stated in another manner, in such embodiments, under control of the drive controller 268, normal operation of the tape drive 226 and specific operation of the tape heads 256 can be powered on and off independently of one another. It is further appreciated that in some such embodiments, the tape drive 226 can include its own tape power supply 269 that can be electrically coupled to and/or operated independently of the power supply 28 for the tape library 10 (illustrated in FIG. 1).

In some embodiments, as shown, the tape drive 226 can further include a cleaning brush 270 and a brush actuator 272 that is usable to selectively move the cleaning brush 270 for purposes of cleaning the tape heads 256. In such embodiments, firmware, software and/or hardware elements within the drive controller 268 can further be configured to send signals to the brush actuator 272 to control movement and operation of the cleaning brush 270 during any cleaning procedure. Additionally, as discussed in greater detail herein below, in certain embodiments, the drive controller 268 can be uniquely configured to initiate certain functions necessary for performed any desired cleaning procedure.

FIG. 3 is a simplified schematic side view illustration of the tape head assembly 356 (or "tape heads") of the tape drive 326 and a portion of an embodiment of a tape 350 in the form of a cleaning tape that is moving across the tape heads 356 to clean the tape heads 356.

Figure 3A:
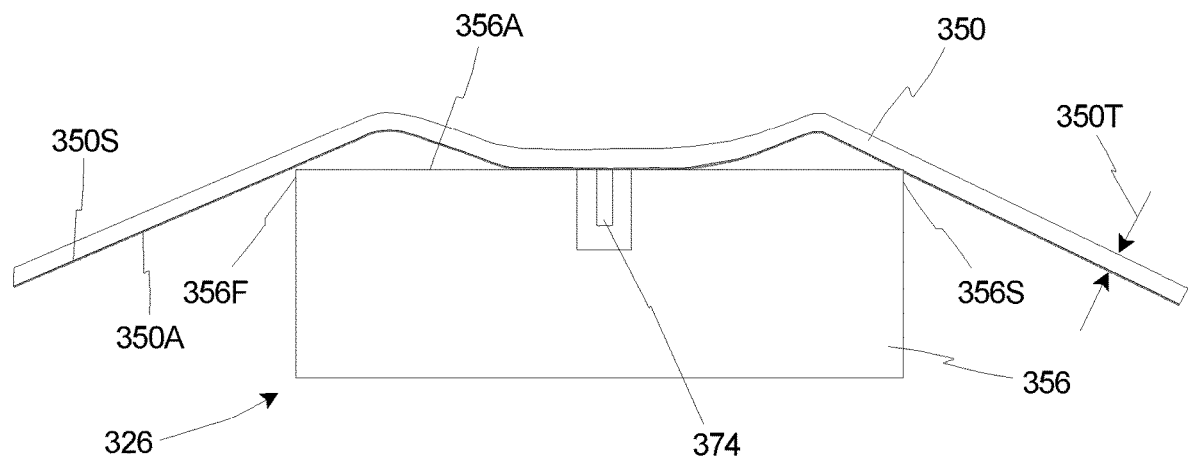
FIG. 3A is a simplified schematic side view illustration of a tape head assembly of the tape drive and a portion of an embodiment of a tape in the form of a cleaning tape that is moving across the tape head assembly to clean the tape head assembly.

As noted above, a standard UCC cleaning cartridge has a tape thickness of approximately 8.9 microns±0.3 microns. When the tape 350 is in motion over a flat contour head, such as shown in FIG. 3A, a first edge 356F of the head assembly 356 encountered by the tape 350 serves to skive air from the tape 350, therefore creating a sub-ambient air pressure which bends the tape 350 closer to the head surface 356A. Thus, for such flat contour tape heads 356, all the contact pressure is concentrated on the two sharp end corner edges. Unfortunately, with the new flat contour design for the tape heads 356 of recent LTO-8 and LTO-9 tape cartridges, the use of UCC cleaning cartridges with such tape thickness has been largely ineffective in providing adequate cleaning of the tape heads 356, as the UCC tape is not sufficiently flexible enough and does not provide sufficient contact pressure on the tape heads 356. Accordingly, in this embodiment, the present invention is directed toward a tape cartridge 220 (illustrated in FIG. 2) and/or cleaning cartridge including a tape 350 that is configured to provide more successful cleaning of the flat contour tape heads 356.

In various embodiments, the tape 350 can be provided in the form of a cleaning tape that has a tape thickness 350T that is more comparable to the tape thickness of data tapes that are being used in current LTO-8 and/or LTO-9 tape drives and tape cartridges. For example, in some embodiments, the cleaning tape 350 can have a tape thickness 350T that is between approximately three microns and seven microns. More specifically, in certain such embodiments, the cleaning tape 350 can have a tape thickness 350T of between approximately four microns and six microns. In other embodiments, the cleaning tape 350 can have a tape thickness 350T that is between approximately three microns and five-and-a-half microns. In still other embodiments, the cleaning tape 350 can have a tape thickness 350T that is between approximately four microns and five-and-a-half microns. In one non-exclusive alternative embodiment, the cleaning tape 350 can have a tape thickness 350T that is approximately five microns. As utilized herein, the approximate tape thickness 350T of the cleaning tape 350 is intended to cover a range that varies by approximately five percent (5%) or ten percent (10%) from the stated values. Alternatively, the cleaning tape 350 can have a tape thickness 350T that is less than approximately three microns.

It is appreciated that with the use of a thinner (and thus less stiff and more flexible) cleaning tape 350, movement of the tape 350 across the tape heads 356 will enable the tape 350 to be more readily displaced due to the sub-ambient pressure that is generated due to such movement so that more of the tape 350 can contact the tape heads 356, i.e. with a higher contact pressure and/or contact ratio. More particularly, as shown, the tape 350 can be effectively sucked down against the head assembly 356 at or near the head sensor 374, which can be positioned approximately centrally between the first edge 356F and a second edge 356S of the head assembly 356. It is appreciated that in some alternative embodiments, the position of the head sensor 374 can be altered such that the head sensor 374 is not positioned approximately centrally between the first edge 356F and the second edge 356S of the head assembly 356, which can also impact the contact pressure and/or contact ratio on the head assembly 356 where the head sensor 374 is located.

Additionally, as shown, the tape 350 can further include an abrasive coating 350A that is coupled and/or affixed to a tape surface 350S that faces toward the tape heads 356 as the tape 350 moves across the tape heads 356. The abrasive coating 350A moving across the tape heads 356 is configured to remove the unwanted debris, dust, lubricants, etc. from the tape heads 356 that has built up over time and use of the tape drive 326.

In various embodiments, the abrasive coating 350A is configured to provide desired cleaning of the tape heads 356 while also inhibiting any damage to the tape heads 356. As provided herein, the TMR sensors of the current LTO-8 and LTO-9 tape drive design can be more sensitive to damage from abrasive substances of many cleaning tapes, such as being more susceptible to scratching damage from asperities from the tape media that may result in undesired read/write head degradation. With such design, the abrasive coating 350A can be designed to have a surface roughness, or abrasivity, that is optimized to make sure unwanted debris, dust, lubricants, etc. are removed but reader sensor pole tip recession is not created. In certain embodiments, the surface roughness of the abrasive coating 350A and/or the tape 350 is configured to be greater than approximately 2 nm. More specifically, in some such embodiments, the surface roughness of the abrasive coating 350A and/or the tape 350 is configured to be between approximately 2 nm and 9 nm. In other such embodiments, the surface roughness of the abrasive coating 350A and/or the tape 350 is configured to be between approximately 2 nm and 6 nm. Alternatively, the surface roughness of the abrasive coating 350A and/or the tape 350 can have another suitable value. As utilized herein, the approximate surface roughness of the abrasive coating 350A and/or the tape 350 is intended to cover a range that varies by approximately five percent (5%) or ten percent (10%) from the stated values.

Further, current specification for the standard UCC cleaning cartridge specifies that there is no servo filed on the cleaning media. However, in certain embodiments of the present invention, in addition to optimizing the tape thickness 350T so the tape 350 can comply to the head surface 356A making proper contact with optimized surface roughness, the cleaning tape 350 can also include a servo field (one or more servo tracks) and one or more data tracks on the cleaning tape 350 so both read and write and servo functions can be used on the same cleaning tape 350. With such design, while cleaning the tape heads 356 with the cleaning tape 350, a closed loop process can be employed to see when and if cleaning is successful so no aggressive open loop cleaning is done that can result in premature pole tip recession which is detrimental to the life of the tape heads 356.

Figure 3B:
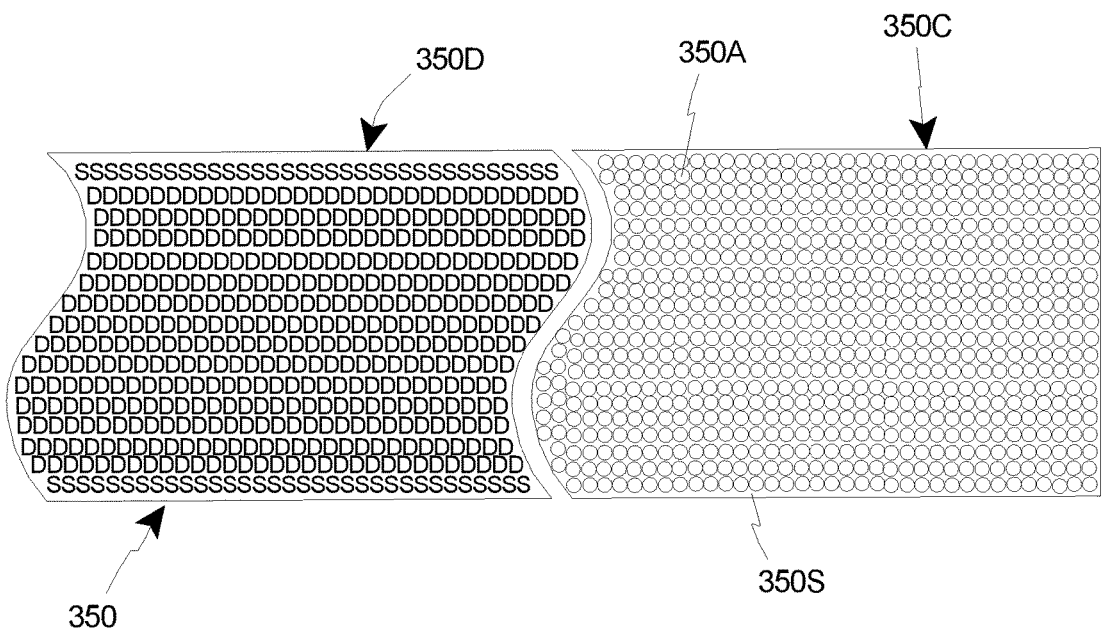
FIG. 3B is simplified schematic illustration of a portion of an embodiment of the tape illustrated in FIG. 3A.

In particular, FIG. 3B is simplified schematic illustration of a portion of an embodiment of the tape 350 illustrated in FIG. 3A. As shown in FIG. 3B, the tape 350 can include a cleaning section 350C, where the tape 350 includes the abrasive coating 350A (illustrated as small circles) that is provided on the tape surface 350S that is configured to face the tape heads 356 during use of the tape 350 to clean the tape heads 356. Additionally, the tape 350 can further include a data section 350D, which includes one or more servo tracks (illustrated with the letter "S", two are shown in FIG. 3B) and one or more data tracks (illustrated with the letter "D", fourteen are shown in FIG. 3B).

With the tape 350 including both the cleaning section 350C and the data section 350D, it is appreciated that the tape 350 can be used to perform a cleaning operation on the tape heads 356, and then with the same tape 350 the effectiveness of the cleaning operation can be evaluated by utilizing the data section 350D for purposes of writing data to and/or reading data from the tape 350. It is further appreciated that the servo tracks in the data section 350D can be utilized to ensure proper alignment of the tape 350 during use.

In another embodiment of the present invention, a particular procedure is followed for purposes of providing desired cleaning for the tape heads. It is noted that in the following flowchart, although it is disclosed that the steps employed for purposes of cleaning the tape heads of the tape drive are performed in a certain order, the steps can alternatively be performed in a different order, and/or one or more of the steps can be combined or eliminated without altering the overall intended scope and breadth of the present invention.

Figure 4:
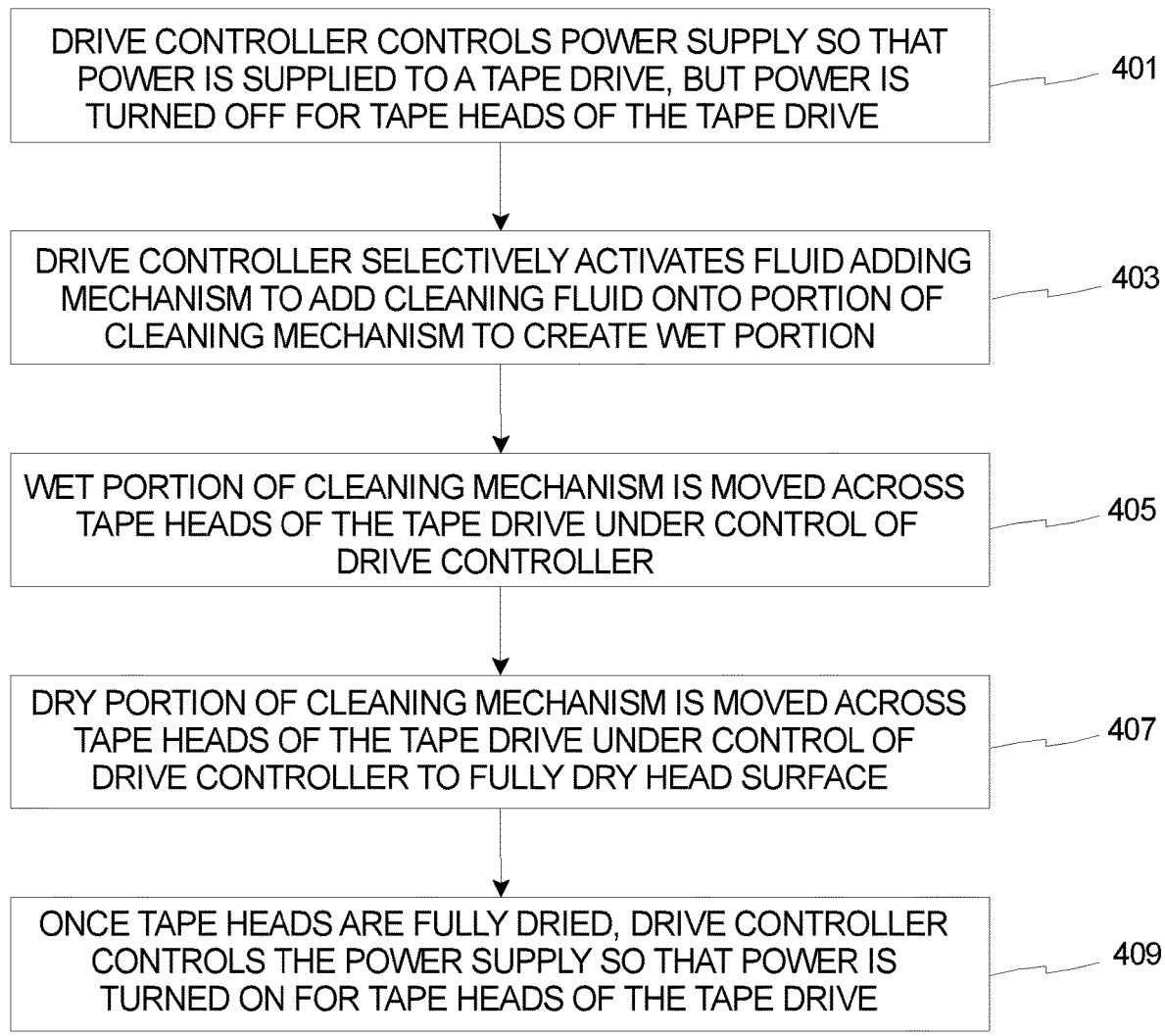
FIG. 4 is a simplified flowchart illustrating an embodiment of a method for cleaning the tape head of the tape drive.

FIG. 4 is a simplified flowchart illustrating an embodiment of a method for cleaning the tape head of the tape drive. As noted above, liquid cleaning solvents have been used successfully for cleaning tape heads and/or head sensors of a tape drive. More particularly, it has been found that a single gentle wipe over the head sensor with a cotton swab with a dab of liquid cleaning solvent can effectively remove tough stains that could not be removed after several UCC cleaning cycles. However, such methodology applied in a tape drive system has required that the tape drive system be in a power off configuration, otherwise the head sensor will be electrically shocked by an electro-static discharge (ESD) if the tape drive system is in a powered state due to condensation buildup on the head surface. Thus, such cleaning procedures accomplished with liquid cleaning solvents have been done as part of a manual cleaning procedure, where power is not required for the tape drive system.

As described, the method of the present invention provides an automated cleaning procedure that utilizes the benefits of the liquid cleaning solvents to effectively clean tape heads and/or head sensors of the tape drive. Moreover, the automated cleaning procedure is followed under general control of the drive controller of the tape drive, which has been configured with changes to the drive firmware, drive hardware and/or drive software to perform the various steps delineated herein.

At step 401, while power is provided to the tape drive, the drive controller is configured to control the power supply, e.g., the power supply for the tape library as a whole and/or the power supply specifically for the tape drive, such that power is turned off to the tape heads of the tape drive. In some embodiments, it is preferred that all connectors to the tape heads are effectively grounded to ensure that no power is going to the tape heads during the initial cleaning portion of this cleaning procedure. In such embodiments, the drive hardware incorporated into the drive controller can be configured such that power from the power supply is effectively multiplexed to switch between open and ground so that power to the tape heads can be selectively turned on and off while power in general is still being supplied to the tape drive as a whole.

At step 403, an automated system is utilized to selectively add cleaning fluid onto a section of a cleaning mechanism to create a wet section of the cleaning mechanism. For example, in certain embodiments, a fluid adding mechanism such as a piezo release mechanism can be selectively activated by the drive controller to add the cleaning fluid onto the section of the cleaning mechanism in a controlled manner. In such embodiments, the drive controller can be configured to control both the timing and amount of cleaning fluid that is added onto the section of the cleaning mechanism to create the wet section of the cleaning mechanism. In one such embodiment, the cleaning mechanism is a cleaning tape that is retained within a (cleaning) tape cartridge, and the fluid adding mechanism can be selectively activated by the drive controller to add the cleaning fluid onto a section of the cleaning tape. In another such embodiment, the cleaning mechanism is a cleaning brush that can be retained within the tape drive, and the fluid adding mechanism can be selectively activated by the drive controller to add the cleaning fluid onto a section of the cleaning brush. In alternative embodiments, the fluid adding mechanism can be included within the tape cartridge and/or the fluid adding mechanism can be included within the tape drive. Further, in certain embodiments, the fluid adding mechanism is refillable such that it can be refilled with cleaning fluid between uses.

In some embodiments, the section of the cleaning tape and/or cleaning brush that is configured to receive the cleaning fluid can be formed from a soft (not stiff), no-lint cloth material that can utilize a capillary effect to absorb the cleaning fluid so as to ensure good contact and thorough covering. It is appreciated that the section of the cleaning tape and/or cleaning brush that is configured to receive the cleaning fluid can be formed from any suitable materials that are able to absorb and subsequently apply/utilize the cleaning fluid to clean the tape heads by moving the cleaning mechanism along and/or across the tape heads.

The cleaning procedure as described herein can include the use of any suitable cleaning fluids for purposes of removing organic/inorganic deposits without damaging the head sensor during cleaning of the tape heads. For example, in one non-exclusive embodiment, the cleaning fluid can include a 70% isopropyl alcohol. Additionally, or in the alternative, the cleaning fluid can include amyl nitrite, or another suitable commercially available solvent.

At step 405, the wet section of the cleaning mechanism, such as the cleaning tape or the cleaning brush, is selectively moved along and/or across the tape heads under control of the drive controller. By moving the wet section of the cleaning mechanism along and/or across the tape heads, the undesired, debris, dust, lubrication, etc. can be effectively removed from the tape heads. It is appreciated that this cleaning method for cleaning the tape heads of the tape drive requires only limited contact pressure between the cleaning mechanism and the tape heads thereby inhibiting damage to the tape heads and/or the head sensor that may otherwise occur due to high contact pressure.

At step 407, another section of the cleaning mechanism, i.e. a dry section of the cleaning mechanism, is moved along and/or across the tape heads under control of the drive controller to fully dry the head surface of the tape heads. In one embodiment, both the wet section of the cleaning mechanism and the dry section of the cleaning mechanism can be provided within a single (cleaning) tape cartridge that can be selectively moved along and/or across the tape heads. In another embodiment, both the wet section of the cleaning mechanism and the dry section of the cleaning mechanism can be provided within a cleaning brush that is retained within the tape drive near and/or substantially adjacent to the tape heads. In still another embodiment, the wet section of the cleaning mechanism can be provided within a (cleaning) tape cartridge that can be selectively moved along and/or across the tape heads, and the dry section of the cleaning mechanism can be provided within a cleaning brush that is retained within the tape drive near and/or substantially adjacent to the tape heads. In yet another embodiment, the wet section of the cleaning mechanism can be provided within a cleaning brush that is retained within the tape drive near and/or substantially adjacent to the tape heads, and the dry section of the cleaning mechanism can be provided within a (cleaning) tape cartridge that can be selectively moved along and/or across the tape heads.

At step 409, once the tape heads of the tape drive are fully dried per step 407, the drive controller controls the power supply, e.g., the power supply for the tape library as a whole and/or the power supply specifically for the tape drive, such that power is once again provided to the tape heads of the tape drive. It is appreciated that at this point, with power being provided to the tape heads as well as to the tape drive as a whole, the tape drive can be used in any desired normal capacity. For example, in one implementation the (cleaning) tape cartridge, in addition to the wet and dry sections that can be included, can further include a data section such as described in detail in relation to FIG. 3B to test the effectiveness of the cleaning procedure. Alternatively, in another implementation, a regular tape cartridge can be utilized to perform any desired operations for writing data to and/or reading data from the tape cartridge with the tape drive.

Figure 5:
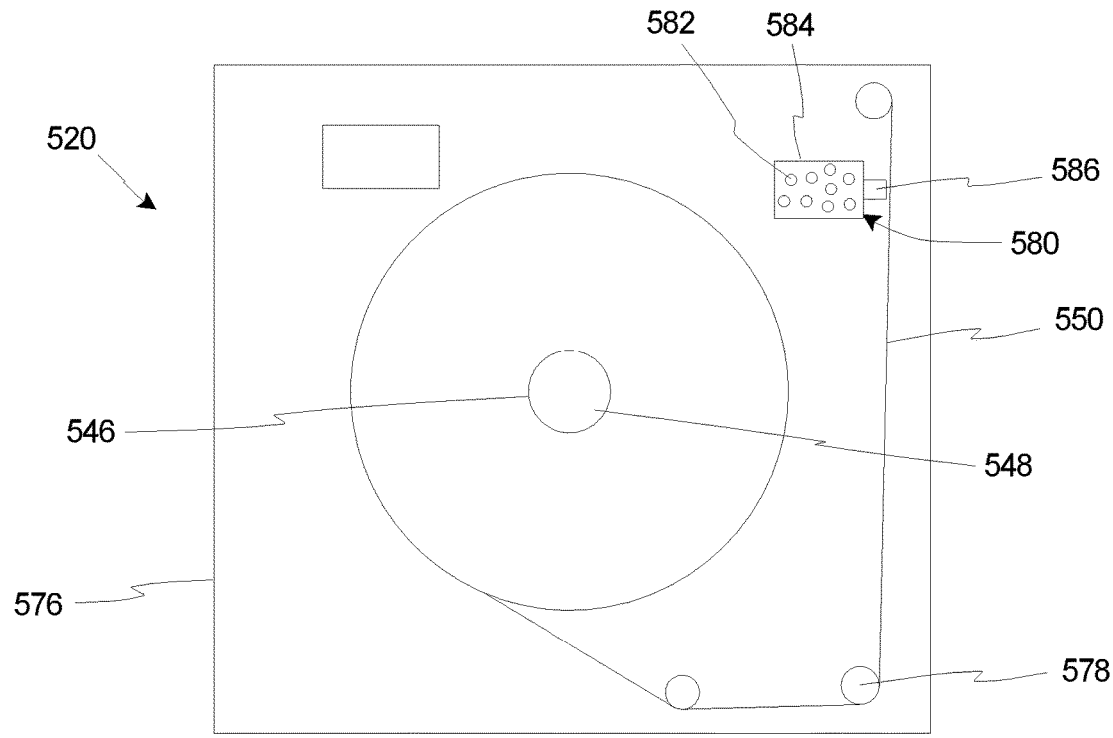
FIG. 5 is a simplified top view illustration of an embodiment of the tape cartridge that is usable for implementing the method illustrated in FIG. 4.

FIG. 5 is a simplified top view illustration of an embodiment of the tape cartridge 520 that is usable for implementing the method illustrated in FIG. 4. In FIG. 5, a cover for the tape cartridge 520 has been omitted for clarity so that the interior of the tape cartridge 520 is visible.

The design of the tape cartridge 520 can be varied to suit the requirements of the tape library 10 (illustrated in FIG. 1) and/or the tape drive 226 (illustrated in FIG. 2). As illustrated, the tape cartridge 520 includes a cartridge body 576 that is configured to retain various other components of the tape cartridge 520. In one embodiment, the cartridge body 576 can be rigid and can have a substantially rectangular-shaped cross-section. Alternatively, the cartridge body 576 can have another suitable shape or configuration. For example, the cartridge body 576 can have a substantially square-shaped or any other suitable shaped cross-section.

The tape cartridge 520 further includes a cartridge reel 546 that includes and/or defines a cartridge hub 548. A tape 550, such as a cleaning tape, is spooled about the cartridge hub 548 of the cartridge reel 546, as in configured to move along a tape path within the cartridge body 576 that is defined, at least in part, by one or more cartridge rollers 578 (three are shown in FIG. 5).

In certain embodiments, as further illustrated in FIG. 5, the tape cartridge 520 can further include a fluid adding mechanism 580 that retains a cleaning fluid 582 (illustrated as small circles) within a mechanism body 584. The fluid adding mechanism 580 can further include a fluid injector 586 that is coupled to the mechanism body 584 and that is configured to selectively add or inject the cleaning fluid 582 onto the tape 550 under control of the drive controller 268 (illustrated in FIG. 2). In some such embodiments, the fluid adding mechanism 580 is provided in the form of a piezo release mechanism that can be selectively activated by the drive controller 268 to add the cleaning fluid 582 onto the tape 550 in a controlled manner.

In such embodiments, as noted above, the fluid adding mechanism 580 can be controlled by the drive controller 268 to selectively add cleaning fluid 582 onto a tape surface 650S (illustrated in FIG. 6) of the tape 550 to create a wet section 688 (illustrated in FIG. 6 with a series of wavy lines) of the tape 550. The wet section 688 of the tape 550 is thus usable for cleaning the tape heads 256 (illustrated in FIG. 2) of the tape drive 226 pursuant to the method described above in relation to FIG. 4.

Figure 6:
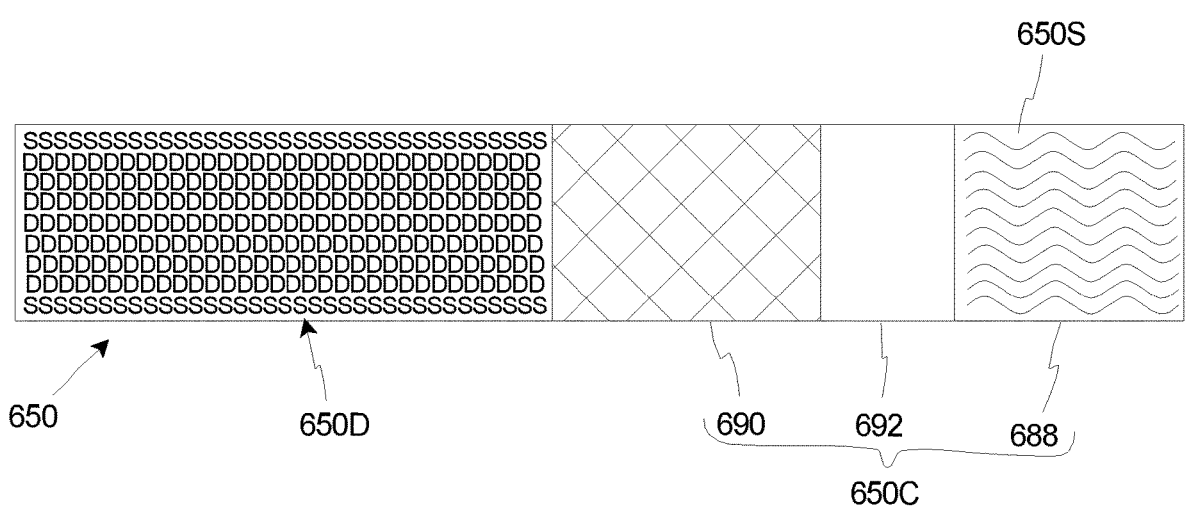
FIG. 6 is a simplified schematic illustration of an embodiment of a cleaning tape that is usable for cleaning the tape head of the tape drive that can be included as part of the tape cartridge illustrated in FIG. 5.

FIG. 6 is a simplified schematic illustration of an embodiment of a cleaning tape 650 that is usable for cleaning the tape heads 256 (illustrated in FIG. 2) of the tape drive 226 (illustrated in FIG. 2) that can be included as part of the tape cartridge 520 illustrated in FIG. 5.

As shown in FIG. 6, the cleaning tape 650 can include a cleaning section 650C and a data section 650D. In this embodiment, the cleaning section 650C includes a wet section 688, a dry section 690 and a spacer section 692. As noted above, the wet section 688 is created along the cleaning tape 650 when cleaning fluid 582 (illustrated in FIG. 5) is selectively added onto a tape surface 650S of the cleaning tape 650. The wet section 688 can be formed from a soft (not stiff), no-lint cloth material that can utilize a capillary effect to absorb the cleaning fluid 582 so as to ensure good contact and thorough covering. It is appreciated that the wet section 688 of the cleaning tape 650 can be formed from any suitable materials that are able to absorb and subsequently apply/utilize the cleaning fluid 582 to clean the tape heads 256 of the tape drive 226 by moving the wet section 688 of the cleaning tape 650 along and/or across the tape heads 256.

As further noted above, the dry section 690 is moved along and/or across the tape heads 256 under control of the drive controller 268 (illustrated in FIG. 2) to fully dry the head surface 356A (illustrated in FIG. 3A) of the tape heads 256.

As illustrated in this embodiment, the spacer section 692 is positioned along the cleaning tape 650 between the wet section 688 and the dry section 690 so that the wet, cleaning operation, and the drying operation can easily be performed independently of one another during the overall cleaning procedure. Additionally, with such design, the cleaning fluid 582 that has been added onto the cleaning tape 650 to create the wet section 688 is inhibited from bleeding over into the dry section 690 of the cleaning tape 650.

The data section 650D of the cleaning tape 650 can be utilized to perform certain normal operational functions. For example, as shown, the data section 650D can include one or more servo tracks (illustrated with the letter "S", two are shown in FIG. 6) and one or more data tracks (illustrated with the letter "D", seven are shown in FIG. 6). With the cleaning tape 650 including both the cleaning section 650C and the data section 650D, it is appreciated that the cleaning tape 650 can be used to perform a cleaning operation on the tape heads 256, and then with the same tape 650 the effectiveness of the cleaning operation can be evaluated by utilizing the data section 650D for purposes of writing data to and/or reading data from the tape 650. It is further appreciated that the servo tracks in the data section 650D can be utilized to ensure proper alignment of the tape 650 during use.

Figure 7:
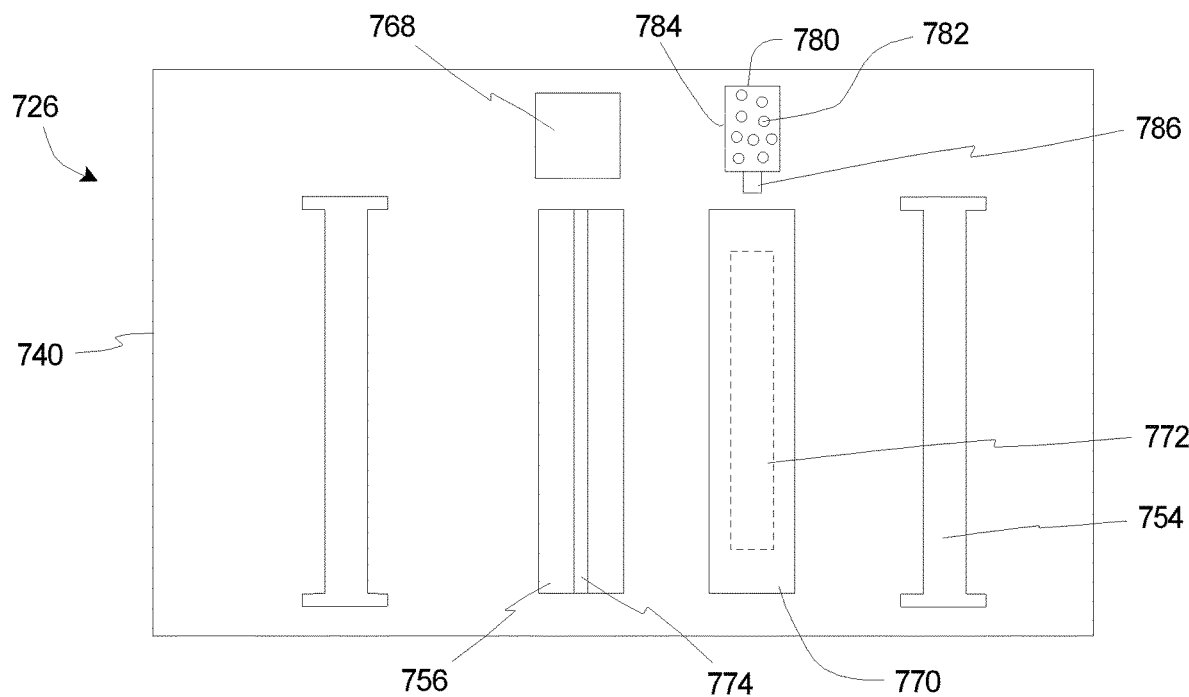
FIG. 7 is a simplified schematic side view illustration of a portion of an embodiment of the tape drive that is usable for implementing the method illustrated in FIG. 4.

FIG. 7 is a simplified schematic side view illustration of a portion of an embodiment of the tape drive 726 that is usable for implementing the method illustrated in FIG. 4. In FIG. 7, a portion of a cover for the tape drive 726 has been omitted for clarity so that the interior of the tape drive 726 is visible.

The design of the tape drive 726 can be varied to suit the requirements of the tape library 10 (illustrated in FIG. 1) within which the tape drive 726 may be used. As illustrated, the tape drive 726 includes a drive housing 740 that is configured to retain various other components of the tape drive 726. In one embodiment, the drive housing 740 can be rigid and can have a substantially rectangular-shaped cross-section. Alternatively, the drive housing 740 can have another suitable shape or configuration. For example, the drive housing 740 can have a substantially square-shaped or any other suitable shaped cross-section.

As shown in this embodiment, the tape drive 726 can further include one or more rollers 754 (two are visible in FIG. 7), a tape head assembly 756 (also referred to as a "head assembly" or "tape heads") including a head sensor 774, a cleaning brush 770, a brush actuator 772 (illustrated in phantom), a fluid adding mechanism 780, and a drive controller 768.

The rollers 754 are configured to guide movement of the tape 250 (illustrated in FIG. 2), such as a magnetic tape and/or a cleaning tape, along a tape path within the drive housing 740. The rollers 754 may also aid in limiting gross lateral movement of the tape 250.

The tape heads 756 and/or the head sensor 774 are configured for writing data to and reading data from the tape 250 as the tape 250 moves across the tape heads 756. As described herein, during use of the tape drive 726, the tape heads 756 tend to get worn and/or contaminated with debris, dust, lubrication, etc. due to the repeated movement of the tape 250 across the tape heads 756. Thus, in this embodiment, the tape drive 726 further includes the cleaning brush 770 that is usable for purposes of providing desired cleaning of the tape heads 756 whenever such cleaning is deemed necessary. For example, the cleaning brush 770 may be utilized for purposes of cleaning the tape heads 756 when the diagnostic tape of the '322 patent determines that the tape-head spacing is so great that it is an appropriate time to clean the tape heads 756 of the tape drive 726. In particular, the drive controller 768 can selectively control the brush actuator 772 to move the cleaning brush 770 to and across the tape heads 756 so that the tape heads 756 can be cleaned.

As illustrated, the fluid adding mechanism 780 can include a mechanism body 784 that is configured to retain the cleaning fluid 782, and a fluid injector 786 that is coupled to the mechanism body 784. When a cleaning procedure is deemed to be necessary and/or appropriate, the drive controller 768 is configured to selectively activate the fluid adding mechanism 780 to add or inject cleaning fluid 782 (illustrated as small circles) via the fluid injector 786 onto a section of the cleaning brush 770 to create a wet section 888 (illustrated in FIG. 8 as a series of wavy lines) of the cleaning brush 770. The wet section 888 of the cleaning brush 770 is thus usable for cleaning the tape heads 756 of the tape drive 726 pursuant to the method described above in relation to FIG. 4. In particular, once the wet section 888 of the cleaning brush 770 has been created under control of the drive controller 768, the drive controller 768 can then selectively move the wet section 888 of the cleaning brush 770 across the head surface 756A of the tape heads 756, by sending appropriate signals to the brush actuator 772, in order to remove unwanted debris, dust, lubrication, etc. from the tape heads 756. As noted above, it is appreciated that the drive controller 768 is further configured to shut off power to the tape heads 756, while still maintaining power to the tape drive 726 as a whole, prior to performing such cleaning procedure.

In some embodiments, the fluid adding mechanism 780 is provided in the form of a piezo release mechanism that can be selectively activated by the drive controller 768 to add the cleaning fluid 782 onto the cleaning brush 770 in a controlled manner. Alternatively, the fluid adding mechanism 780 can have another suitable design.

Figure 8:
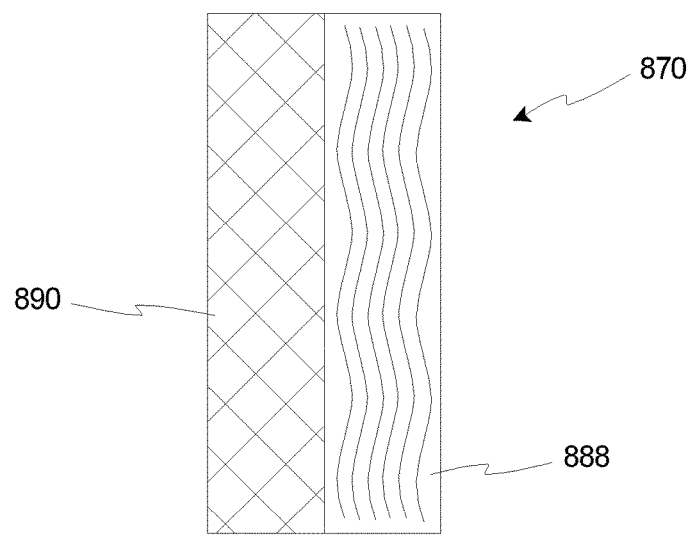
FIG. 8 is a simplified schematic illustration of an embodiment of a cleaning brush that can be included as part of the tape drive illustrated in FIG. 7.

FIG. 8 is a simplified schematic illustration of an embodiment of a cleaning brush 870 that can be included as part of the tape drive 726 illustrated in FIG. 7.

As shown in FIG. 8, the cleaning brush 870 includes a wet section 888 and a dry section 890. As noted above, the wet section 888 is created along the cleaning brush 870 when cleaning fluid 782 (illustrated in FIG. 7) is selectively added onto a particular section of the cleaning brush 870. The wet section 888 can be formed from a soft (not stiff), no-lint cloth material that can utilize a capillary effect to absorb the cleaning fluid 782 so as to ensure good contact and thorough covering. It is appreciated that the wet section 888 of the cleaning brush 870 can be formed from any suitable materials that are able to absorb and subsequently apply/utilize the cleaning fluid 782 to clean the tape heads 756 (illustrated in FIG. 7) of the tape drive 726 by moving the wet section 888 of the cleaning brush 870 along and/or across the tape heads 756.

As further noted above, the dry section 890 is moved along and/or across the tape heads 756 under control of the drive controller 768 (illustrated in FIG. 7) to fully dry the head surface 756A (illustrated in FIG. 7) of the tape heads 756.

It is understood that although a number of different embodiments of the tape library system, the tape drive and/or the tape cartridge have been illustrated and described herein, one or more features of any one embodiment can be combined with one or more features of one or more of the other embodiments, provided that such combination satisfies the intent of the present invention.

While a number of exemplary aspects and embodiments of the tape library system, the tape drive and/or the tape cartridge have been discussed above, those of skill in the art will recognize certain modifications, permutations, additions, and sub-combinations thereof. It is therefore intended that the following appended claims and claims hereafter introduced are interpreted to include all such modifications, permutations, additions, and sub-combinations as are within their true spirit and scope.

What is claimed is:

1. A combination comprising:
a tape drive including (i) a drive housing that is configured to selectively receive a tape cartridge; (ii) a head assembly positioned within the drive housing that is configured for writing data to and reading data from a tape that is retained within a cartridge housing of the tape cartridge; and (ii) a drive controller positioned within the drive housing that is configured to control operation of the tape drive;
a cleaning mechanism that is configured to clean the head assembly of the tape drive under control of the drive controller, the cleaning mechanism being in the form of a cleaning cartridge that retains a cleaning tape, the cleaning cartridge being selectively received within the drive housing of the tape drive, the drive controller controlling the cleaning tape to move across the head assembly to clean the head assembly of the tape drive;
a power supply that is configured to supply power to the tape drive, the drive controller being electrically coupled to the power supply, the drive controller being configured to selectively turn off power to the head assembly of the tape drive while power is otherwise being supplied to operate the tape drive; and
a fluid adding mechanism that is controlled by the drive controller to selectively add a cleaning fluid onto a section of the cleaning tape to create a wet section of the cleaning tape; the drive controller further controlling the cleaning tape so that the wet section of the cleaning tape moves across the head assembly to clean the head assembly of the tape drive, the fluid adding mechanism being a piezo release mechanism.

2. The combination of claim 1 wherein the cleaning tape further includes a dry section; and wherein the drive controller controls the cleaning tape so that the dry section moves across the head assembly to dry to head assembly after the wet section of the cleaning tape has been used to clean the head assembly of the tape drive.

3. The combination of claim 1 wherein the fluid adding mechanism retains the cleaning fluid within a mechanism body.

4. A combination comprising:
a tape drive including (i) a drive housing that is configured to selectively receive a tape cartridge; (ii) a head assembly positioned within the drive housing that is configured for writing data to and reading data from a tape that is retained within a cartridge housing of the tape cartridge; and (ii) a drive controller positioned within the drive housing that is configured to control operation of the tape drive;
a cleaning mechanism that is configured to clean the head assembly of the tape drive under control of the drive controller, the cleaning mechanism being in the form of a cleaning brush that is positioned within the drive housing; wherein the cleaning brush is selectively movable with a brush actuator to be positioned directly adjacent to the head assembly; and wherein the drive controller controls the brush actuator to selectively move the cleaning brush across the head assembly to clean the head assembly of the tape drive;
a power supply that is configured to supply power to the tape drive, the drive controller being electrically coupled to the power supply, the drive controller being configured to selectively turn off power to the head assembly of the tape drive while power is otherwise being supplied to operate the tape drive; and a fluid adding mechanism that is controlled by the drive controller to selectively add a cleaning fluid onto a section of the cleaning brush to create a wet section of the cleaning brush; the drive controller further controlling the cleaning brush so that the wet section of the cleaning tape brush moves across the head assembly to clean the head assembly of the tape drive.

5. The combination of claim 4 wherein the fluid adding mechanism is a piezo release mechanism.

6. The combination of claim 4 wherein the cleaning brush further includes a dry section; and wherein the drive controller controls the cleaning brush so that the dry section moves across the head assembly to dry to head assembly after the wet section of the cleaning brush has been used to clean the head assembly of the tape drive.

7. A tape cartridge for use in cleaning a head assembly of a tape drive, the tape cartridge comprising:
   a cartridge housing; and
   a tape that is retained within the cartridge housing, the tape including a cleaning section having a tape surface and an abrasive coating that is coupled to the tape surface;
   a fluid adding mechanism that selectively adds a cleaning fluid onto the cleaning section to create a wet section of the cleaning tape, the wet section of the cleaning tape being configured to move across the head assembly to clean the head assembly of the tape drive, the fluid adding mechanism being a piezo release mechanism;
   wherein the tape has a tape thickness of between approximately three microns and seven microns; and
   wherein the abrasive coating has a surface roughness of at least approximately two nanometers.

8. The tape cartridge of claim 7 wherein the tape thickness is between approximately four microns and six microns.

9. The tape cartridge of claim 7 wherein the tape thickness is between approximately three microns and five-and-a-half microns.

10. The tape cartridge of claim 7 wherein the tape thickness is approximately five microns.

11. The tape cartridge of claim 7 wherein the surface roughness of the abrasive coating is between approximately two nanometers and nine nanometers.

12. The tape cartridge of claim 7 wherein the surface roughness of the abrasive coating is between approximately two nanometers and six nanometers.

13. The tape cartridge of claim 7 wherein the tape further includes a data section including one or more data tracks.

14. The tape cartridge of claim 13 wherein the data section further includes one or more servo tracks.

15. A combination comprising a tape drive including a head assembly; and the tape cartridge of claim 7 that is usable in the tape drive for cleaning the head assembly of the tape drive.

16. The combination of claim 15 wherein the tape drive includes a drive controller that is configured to control movement of the tape from the tape cartridge across a head surface of the head assembly to clean the head assembly of the tape drive.

17. The combination of claim 16 wherein the drive controller is further configured to control power from a power supply such that power can be selectively turned off to the head assembly while power is otherwise being supplied to operate the tape drive.

18. The tape cartridge of claim 7 wherein the fluid adding mechanism retains the cleaning fluid within a mechanism body.

19. The tape cartridge of claim 18 wherein the fluid adding mechanism further includes a fluid injector that is coupled to the mechanism body.

20. The tape cartridge of claim 19 wherein the fluid injector is configured to selectively add or inject the cleaning fluid onto the tape.

* * * * *